United States Patent [19]

Brax

[11] 4,118,215

[45] Oct. 3, 1978

[54] METHOD AND APPARATUS FOR HEATING GLASS IN A FOREHEARTH

[75] Inventor: Jean Albert Brax, Chalon sur Saone, France

[73] Assignee: Saint-Gobain Industries, Neuilly-sur-Seine, France

[21] Appl. No.: 833,965

[22] Filed: Sep. 16, 1977

[30] Foreign Application Priority Data

Sep. 21, 1976 [FR] France ............................. 76 28322

[51] Int. Cl.² .............................................. C03B 5/22
[52] U.S. Cl. ........................................ 65/134; 65/136; 65/327; 65/347
[58] Field of Search ................. 65/134, 136, 327, 335, 65/347, DIG. 4; 13/6

[56] References Cited

U.S. PATENT DOCUMENTS

| | | | |
|---|---|---|---|
| 2,919,297 | 12/1959 | Augsburger | 65/DIG. 4 |
| 3,198,619 | 8/1965 | Nuzum | 65/DIG. 4 |
| 3,531,275 | 9/1970 | Magnusson et al. | 65/136 X |
| 3,725,558 | 4/1973 | t'Serstevens | 13/6 |
| 4,012,218 | 3/1977 | Sorg et al. | 65/347 X |

*Primary Examiner*—Arthur D. Kellogg
*Attorney, Agent, or Firm*—Pennie & Edmonds

[57] ABSTRACT

A method and apparatus are disclosed for heating molten glass in a forehearth of a glass furnace connected to a plurality of feeder conduits. An electrode is positioned at the inlet of the forehearth and another electrode is positioned at the inlet of at least one of the feeder conduits. As a stream of molten glass is directed from the inlet of the forehearth to the inlet of the feeder conduit, the electrodes are energized to produce an electric current flow between the electrodes and through the molten glass stream to heat the glass.

11 Claims, 5 Drawing Figures

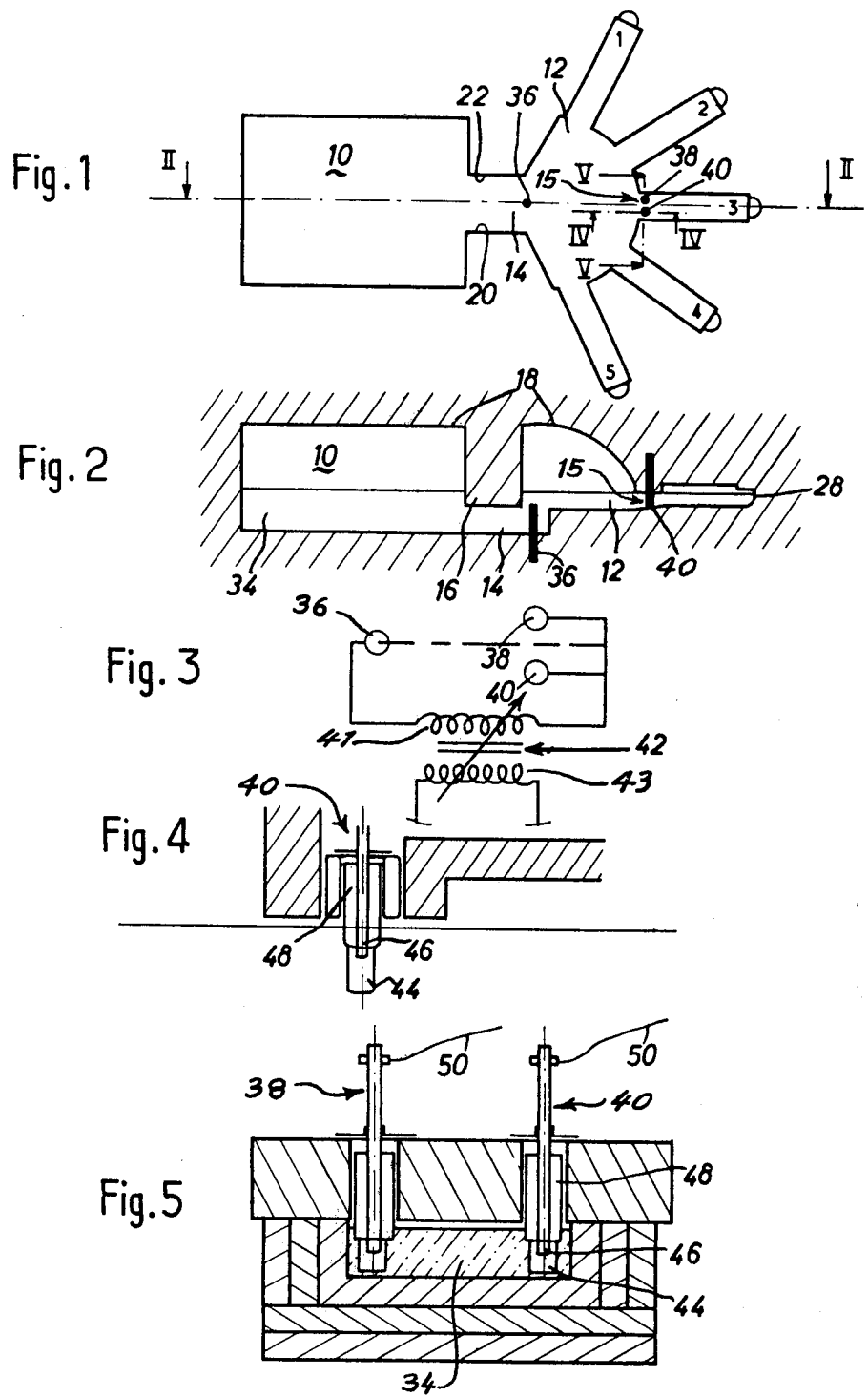

METHOD AND APPARATUS FOR HEATING GLASS IN A FOREHEARTH

BACKGROUND OF THE INVENTION

1. Field of the Invention

This invention relates to a method and apparatus for heat treating molten glass in the forehearth of a glass furnace.

2. Description of the Prior Art

In the manufacture of glass articles such as bottles, molten glass is retained in the forehearth of a hollow glass furnace. When needed, the molten glass is withdrawn from the forehearth and delivered to several distribution conduits known as feeder conduits or "feeders". Parisons or gobs of glass pass from the feeders to forming machines which produce the desired glass article.

To prevent the glass from solidifying when the furnace is shut down, the forehearth is heated by gas burners. When the furnace is again operated, the power to the burners is increased to bring the entire mass of glass contained in the forehearth to a desired temperature.

Ideally, identical quantities of glass are drawn through each feeder and the average temperatures of the glass at the inlet of the various feeders are identical. In operation, however, the daily glass flow rates from each feeder differ from one another and their average inlet temperatures are different. In particular, the feeders having the lower flow rates also have the lower temperatures. Consequently, additional heat must be supplied to the molten glass contained in these feeders to bring the glass to a desired feeder output temperature. In the prior art, additional heating is effected by forehearth burners; but the glass entering these feeders still does not have a uniform temperature. Such thermal heterogeneities are detrimental because they cause substantial variations in the physical and chemical properties of the pieces manufactured from such glass.

When only one feeder is operating and its glass flow rate is low, the molten glass in the forehearth stagnates and cools to a temperature which is lower than the desired feeder output temperature. To maintain the desired output temperature, the prior art teaches one to overheat the entire mass of glass in the forehearth so that a small portion may be drawn from the operating feeder at the desired temperature. This is an excessively costly process. The prior art also teaches one to utilize burners aligned with the stream of molten glass passing through the forehearth and to the operating feeder. The burners heat the surface of the stream to a higher temperature than the glass beneath the surface. This, however, is unsatisfactory because the molten glass stream stratifies into layers having different temperatures, resulting in glass having undesirable properties.

SUMMARY OF THE INVENTION

I have invented an improved method and apparatus which overcome the above difficulties by achieving uniform heating of the glass passing through the forehearth to the feeders.

My invention provides an improved method and apparatus for heating molten glass in a forehearth of a glass furnace which communicates with a plurality of feeder conduits or feeders. An inlet is located between the glass furnace and the forehearth and between each feeder conduit and the forehearth. A first electrode is inserted in the molten glass adjacent the inlet of the forehearth and a second electrode is inserted in the molten glass adjacent the inlet of at least one feeder conduit. A stream of molten glass is directed from the inlet of the forehearth to the inlet of at least one feeder conduit. Electric current is passed along the molten glass stream between the inlet of the forehearth and the inlet of the feeder conduit to heat the glass stream.

In addition to improving the thermal homogeneity of the molten glass, the present invention effects an overall energy savings of up to 30% over the prior art wherein burners are solely utilized to heat the molten glass within the forehearth.

BRIEF DESCRIPTION OF THE DRAWINGS

Preferred embodiments of the invention are described below the illustrated in the accompanying drawings, wherein:

FIG. 1 is a diagrammatic, plan sectional view of a glass production installation according to an illustrative embodiment of the present invention;

FIG. 2 is a diagrammatic, vertical sectional view of such an installation taken along line II—II of FIG. 1;

FIG. 3 is a circuit diagram according to the present invention;

FIG. 4 is a sectional view taken along line IV—IV of FIG. 1; and

FIG. 5 is a sectional view taken along line V—V of FIG. 1.

DETAILED DESCRIPTION OF THE PREFERRED EMBODIMENTS

FIGS. 1 and 2 illustrate a hollow glass production installation including a furnace 10, a forehearth 12, a dome 18, and feeders 1-5, which are typical of the prior art, and electrodes 36, 38 and 40, which are positioned and utilized in accordance with my invention.

Furnace 10 and forehearth 12 are covered by dome 18, and gas burners (not shown) may be positioned within the dome and in the side walls of the furnace and/or forehearth. Furnace 10 communicates with forehearth 12 through a narrow inlet channel or neck 14 defined by a part 16 projecting downwardly from dome 18 and by parts 20, 22 projecting inwardly from the side walls of furnace 10. The width of inlet channel 14 is less than the width of forehearth 12 to provide an area of constricted glass flow. The inlet of each feeder 1-5 is connected to forehearth 12 at a position opposite to the inlet of the forehearth. A glass bath 34 is retained within furnace 10, forehearth 12, and feeders 1-5, and is maintained in a molten state by the gas burners. Molten glass flows from the furnace 10, through channel 14 and into forehearth 12. When needed, streams of molten glass are drawn across forehearth 12, through the feeder inlets and feeders 1-5 and into forming machines which manufacture desired glass articles.

At times, it is desirable to operate the installation using only one feeder, for example, feeder 3. However, in the prior art, with only one working feeder, the molten glass in the forehearth stagnates and cools to a temperature which is lower than the desired operating temperature. In my invention, to avoid this cooling, an additional quantity of thermal energy is supplied to the molten glass passing to the only operative feeder 3 via first electrode 36 and second electrodes 38, 40. Electrode 36 is positioned at the transverse center of the inlet of the forehearth 12 and electrodes 38 and 40 are positioned at inlet 15 of feeder 3 in a line transverse to the flow of molten glass through this feeder. According to the present invention, a voltage is applied across first electrode 36 and second electrodes 38, 40 to produce a current therebetween. The molten glass between the electrodes acts as a resistive medium for generating heat and the temperature of the stream of molten glass passing from channel 14 to feeder 3 is thereby increased.

Referring to FIG. 3, there is shown a circuit diagram according to the present invention. Electrodes 36 and 38, 40 are respectively connected to the ends of a secondary coil 41 of a variable transformer 42. A primary coil 43 of the transformer is connected to an appropriate source of current (not shown). Current passes through the molten glass between first electrode 36 and second electrodes 38, 40 to heat the stream of glass flowing from the inlet of forehearth 12 to the inlet of feeder 3. This additional heating supplements the thermal energy provided by the burners and uniformly maintains the molten glass entering feeder 3 at its desired output temperature.

Referring to FIGS. 4 and 5, there is shown an enlarged view of electrodes 38 and 40. Illustratively, electrodes 38, 40 and 36 are of the type described in U.S. application Ser. No. 772,023 filed Feb. 25, 1977, now U.S. Pat. No. 4,069,032, which is incorporated herein by reference. Each electrode comprises an electrode proper 44 made of molybdenum which is screwed onto an electrode holder shaft 46 made of refractory steel. Shaft 46 is protected on the outside by a protective tube 48 which is made of refractory material. An electric supply cable 50 is fastened to shaft 46. The ends of electrodes 44 are completely immersed in molten glass 34 to prevent them from burning in the air.

The advantages of the present invention are illustrated through tests made on a glass furnace having five feeders for the production of bottles of the "Champagne 4" type which draw 228 metric tons of molten glass per day. The following table lists the average temperatures of the glass at the inlet of the five feeders of the furnace and the flow rate of these feeders when the invention is not being practiced. The average temperature is the arithmetic mean of $n$ temperatures measured at a cross-section of the inlet of the specified feeder.

TABLE

| Feeder | Furnace Output (Metric Tons/day) | Average Temperature at Inlet of Feeders (° C) |
| --- | --- | --- |
| 1 | 84 | 1246 |
| 2 | 42 | 1229 |
| 3 | 18 | 1202 |
| 4 | 35 | 1222 |
| 5 | 49 | 1234 |
| Total | 228 | |

From the Table, it is seen that feeder 3 has the lowest flow rate. The glass entering this feeder has the lowest temperature and consequently its parisons are the coldest. When feeder 3 is heated according to the present invention by 18 kW of electric power, the average temperature at the inlet of feeder 3 raises advantageously from 1202° to 1254° C. even though its flow rate remains at 18 metric tons per day.

Another advantage of the present invention lies in the improvement of the thermal homogeneity of the glass at the inlet of feeder 3. Before applying the electric energy according to the present invention, an extreme diviation of 118° C. was noted in the temperatures measured at the inlet of feeder 3 of the above furnace. After applying 18 kW of power according to the invention, the temperature deviation was advantageously reduced to 35° C.

Furthermore, utilizing auxiliary electric energy results in energy savings of approximately 30% in the heating of the glass entering feeder 3 compared with utilizing only burners.

Finally, an improvement is noted in the mechanical properties of bottles manufactured by the forming machine fed with molten glass from feeder 3. For example, the resistance to internal pressure of such bottles of the "Champagne 4" type increased by 2 bars.

While the invention has been described in conjunction with certain embodiments, it is understood that various modifications and changes may be made without departing from the spirit and scope of the invention. For example, electrodes 38 and 40 may be replaced by a single electrode which may be placed anywhere along the feeder. Additionally, feeder 3 need not be the feeder having an electrode therein. Electrodes may be positioned within adjacent the inlet of any one or all of the feeders. The electrodes may be wired to permit current to pass from electrode 36 to one or more of these electrodes when its associated feeder has a low flow rate and/or is the only operating feeder. Further, electrode 36 may be placed within forehearth 12 or neck 14 adjacent the inlet of the forehearth.

I claim:

1. A method for heating molten glass in a relatively large forehearth communicating with a plurality of relatively small feeder conduits, the method comprising:
   (a) directing a stream of molten glass from an inlet of the forehearth to an inlet of at least one feeder conduit;
   (b) passing a centrally disposed electric heating current along said stream between the inlet of the forehearth and the inlet of a feeder conduit providing a source of glass;
   (c) whereby said heating is effected by adding a quantity of thermal energy to the molten glass; and
   (d) whereby molten glass in the forehearth is maintained at a desired operating temperature.

2. The method according to claim 1 wherein the step of passing an electric current comprises:
   (a) inserting a first electrode in the molten glass at the inlet of the forehearth;
   (b) inserting a second electrode in the molten glass at the inlet of the feeder conduit; and
   (c) energizing the electrodes so that an electric current passes therebetween.

3. An apparatus for conveying molten glass from a glass furnace which comprises:
   (a) a relatively large forehearth for receiving molten glass from the glass furnace, said forehearth having an inlet connecting it to the glass furnace;
   (b) a plurality of relatively small feeder conduits having inlets connecting them to the forehearth;
   (c) a first electrode centrally inserted in the molten glass adjacent the inlet to the forehearth;
   (d) a second electrode inserted in the molten glass adjacent the inlet of at least one feeder conduit; and
   (e) means for energizing said first and second electrodes to produce electric current flow along the molten glass between said electrodes and heat the molten glass passing from the forehearth to said feeder conduit.

4. The apparatus according to claim 3 wherein there are at least two second electrodes positioned at the inlet of said feeder conduit transverse to the flow of molten glass.

5. The apparatus according to claim 3 wherein the glass furnace and the forehearth are connected by a channel having a width which is less than the width of the forehearth and wherein said first electrode is positioned centrally within the inlet of the forehearth.

6. The apparatus according to claim 3 wherein at least one of said electrodes comprises:
 (a) an electrode proper having an end immersed in the molten glass;
 (b) an electrode holder shaft encircled by said electrode proper, said electrode proper being energized through said holder shaft; and
 (c) a protective tube which encircles said electrode holder shaft and said electrode proper.

7. The apparatus according to claim 6 wherein the electrode proper is made of molybdenum.

8. An apparatus for conveying molten glass from a glass furnace which comprises:
 (a) a relatively large forehearth having an inlet for receiving molten glass from the glass furnace;
 (b) an inlet channel connecting the glass furnace with the inlet of the forehearth, said inlet channel having a width smaller than the width of the forehearth;
 (c) a plurality of relatively small feeder conduits for extracting molten glass from the forehearth and having inlets connecting them to said forehearth;
 (d) a first electrode inserted in the molten glass at the transverse center of the inlet of the forehearth;
 (e) at least two second electrodes inserted in the molten glass at the inlet of one of said feeder conduits; and
 (f) means for energizing said first and second electrodes to produce electric current flow along the molten glass between said first and second electrodes to heat the molten glass passing from the forehearth to the inlet of said feeder conduit.

9. The apparatus according to claim 8 wherein second electrodes are positioned adjacent the inlet of each feeder conduit.

10. The apparatus according to claim 8 wherein at least one of the electrodes comprises:
 (a) an electrode proper having an end immersed in the molten glass;
 (b) an electrode holder shaft encircled by said electrode proper, said electrode proper being energized through said holder shaft; and
 (c) a protective tube which encircles said electrode holder shaft and said electrode proper.

11. A glass production apparatus comprising:
 (a) a furnace for producing molten glass;
 (b) a relatively large forehearth for receiving molten glass from the glass furnace;
 (c) a channel connecting the glass furnace to the forehearth for conveying molten glass from the glass furnace to the forehearth, said channel having a width which is less than the width of forehearth to provide an area of constricted glass flow;
 (d) a plurality of relatively small feeder conduits for extracting molten glass from the forehearth, said feeder conduits being connected to the side of the forehearth opposite said channel to provide each feeder with a stream of molten glass flowing from said channel, through said forehearth and into said feeder;
 (e) a first electrode inserted in the molten glass at the area of constricted glass flow;
 (f) a second electrode inserted in the molten glass in one of said feeder conduits; and
 (g) means to energize said first and second electrodes to produce electric current flow along the stream passing to said feeder to heat said stream.

* * * * *